United States Patent
Hedqvist et al.

(10) Patent No.: US 9,179,387 B2
(45) Date of Patent: Nov. 3, 2015

(54) HANDOVER FOR A PORTABLE COMMUNICATION DEVICE BETWEEN WIRELESS LOCAL AND WIDE AREA NETWORKS

(75) Inventors: Pekka Hedqvist, Stockholm (SE); Per Gunningberg, Uppsala (SE); Mattias Hansson, Stockholm (SE); Esbjörn Köhler, Enköping (SE); Jonne Kodu, Stockholm (SE)

(73) Assignee: OPTIMOBILE AB, Kista (SE)

( * ) Notice: Subject to any disclaimer, the term of this patent is extended or adjusted under 35 U.S.C. 154(b) by 1553 days.

(21) Appl. No.: 10/585,783

(22) PCT Filed: Jan. 24, 2005

(86) PCT No.: PCT/SE2005/000081
§ 371 (c)(1),
(2), (4) Date: Jul. 11, 2006

(87) PCT Pub. No.: WO2005/071998
PCT Pub. Date: Aug. 4, 2005

(65) Prior Publication Data
US 2009/0191878 A1    Jul. 30, 2009

(30) Foreign Application Priority Data
Jan. 23, 2004    (SE) .................................. 0400140

(51) Int. Cl.
| H04W 36/00 | (2009.01) |
| H04W 36/32 | (2009.01) |
| H04W 36/14 | (2009.01) |
| H04W 84/04 | (2009.01) |
| H04W 84/12 | (2009.01) |

(52) U.S. Cl.
CPC .............. *H04W 36/32* (2013.01); *H04W 36/14* (2013.01); *H04W 84/04* (2013.01); *H04W 84/12* (2013.01)

(58) Field of Classification Search
USPC ..................... 455/425, 422.1; 370/338, 331
See application file for complete search history.

(56) References Cited

U.S. PATENT DOCUMENTS

| 5,146,609 | A | * | 9/1992 | Tayloe et al. ................. 455/436 |
| 5,463,673 | A | * | 10/1995 | Herscovici .................... 455/446 |
| 5,608,779 | A | * | 3/1997 | Lev et al. ...................... 455/436 |
| 6,055,426 | A | * | 4/2000 | Beasley .................... 455/432.1 |

(Continued)

FOREIGN PATENT DOCUMENTS

| WO | WO-03/015315 A1 | 2/2003 |
| WO | WO-03/065682 A1 | 8/2003 |

*Primary Examiner* — German J Viana Di Prisco
(74) *Attorney, Agent, or Firm* — Capitol City TechLaw, PLLC (57) ABSTRACT

The present invention relates to a method, call handling server (18), local wireless network (10) and computer program product for performing vertical handover of a wireless voice connection, which is a part of a voice connection set up between a portable communication (22) device and another device. The network comprises a number of access points (20) and the call handling server (18) for controlling voice connections to the portable device. The server comprises a control unit (24) that determines a handover situation for the wireless connection to the portable device based on a set of handover factors that comprise the position and movement of the portable communication device in an area of the local network and structural layout information of the area together with knowledge of where in this area there is insufficient coverage.

13 Claims, 6 Drawing Sheets

(56) References Cited

U.S. PATENT DOCUMENTS

| | | |
|---|---|---|
| 6,393,282 B1 * | 5/2002 | Iimori .................. 455/432.1 |
| 6,778,521 B1 * | 8/2004 | Korpela et al. ............. 370/345 |
| 6,950,657 B1 * | 9/2005 | Hiller et al. ............... 455/445 |
| 7,046,678 B2 * | 5/2006 | Jiang et al. ............. 370/395.41 |
| 7,092,709 B1 * | 8/2006 | Honkala et al. .......... 455/432.1 |
| 2002/0085516 A1 * | 7/2002 | Bridgelall ................. 370/329 |
| 2003/0193910 A1 * | 10/2003 | Shoaib et al. .............. 370/331 |
| 2003/0229478 A1 * | 12/2003 | Rappaport et al. ............. 703/13 |
| 2004/0017310 A1 * | 1/2004 | Vargas-Hurlston et al. ................. 342/357.1 |
| 2004/0090937 A1 * | 5/2004 | Chaskar et al. ............. 370/331 |
| 2004/0137901 A1 * | 7/2004 | Hamasaki et al. .......... 455/436 |
| 2004/0137902 A1 * | 7/2004 | Chaskar et al. ............. 455/436 |
| 2004/0192211 A1 * | 9/2004 | Gallagher et al. ......... 455/67.11 |
| 2004/0264410 A1 * | 12/2004 | Sagi et al. ................. 370/331 |
| 2005/0059400 A1 * | 3/2005 | Jagadeesan et al. ......... 455/436 |
| 2005/0083840 A1 * | 4/2005 | Wilson ..................... 370/230 |
| 2005/0143088 A1 * | 6/2005 | Hirsbrunner et al. ........ 455/455 |
| 2006/0034229 A1 * | 2/2006 | Joo et al. .................. 370/335 |
| 2006/0135150 A1 * | 6/2006 | Oh ......................... 455/425 |

* cited by examiner

HANDOVER FOR A PORTABLE COMMUNICATION DEVICE BETWEEN WIRELESS LOCAL AND WIDE AREA NETWORKS

TECHNICAL FIELD OF THE INVENTION

The present invention relates to the field of telecommunication and more particularly to the field of handing over voice connections for a portable communication device between a local wireless network and a wireless wide area network.

DESCRIPTION OF RELATED ART

It is well known to provide local wireless networks that allow a user of a portable communication device to move freely for instance within the office of a company. Several techniques exist for this, such as DECT and Wireless Local Area Network (WLAN) as well as possibly Bluetooth.

It is furthermore known to provide portable communication devices with dual functionalities, like for instance for enabling communication with such a local wireless as well as a wireless wide area system, like for instance GSM. This allows the user of the terminal to use the local network within an office and the wireless wide area network outside the office. It would however be beneficial if the terminal can hand over a call from one system to the other when a user is for instance moving out of the office, so that the local connection is not terminated abruptly and the user has to make a new call in the wide area network when he is out of the office. This type of handover is known as a vertical handover. A handover within the same network is known as a horizontal handover.

It is generally known to provide handover between different networks. An application specific problem with handover is the inherent delay when switching from one network to another. This is caused by the time to set-up the new network interface and to redirect data to that interface. During the switch-over time some data are (mis)directed to the old connection and will be lost. In a voice conversation this loss will cause a gap. For horizontal handover, from one base-station to another, this gap is hardly noticeable since the signalling is simple and the distance between base stations is short. For vertical handover the problem is more significant since look-up servers are involved as well as signalling of two systems. Furthermore data may need to be translated into a new representation (e.g. G.711 codec to GSM), which causes an initialization delay.

The common solution to handle the small gaps is to mask it by introducing a "playout"-buffer at the receivers. The solution works well for small gaps but not for longer gaps since the buffer introduces artificial delays that will hamper the interactive dialogue.

Another known solution is called "soft handoff". In this case a node (source node, home agent node, proxy, explicit server etc) in the network flow the same data to both the new as well as the old address simultaneously (e.g. by multicasting) during a short time period. The receiving device may then need to synchronize the flows, resort packets, discard duplicates and at some point disconnect the old connection.

The major shortcoming of the above described solutions for the general problem is the long delay when switching from one interface to another.

The problem is exaggerated in a building for WLANs. The signal strength varies more dramatically compared to outdoors due to reflections and dampening materials. The signal strength indoor is not a monotonically decreasing function with distance in the same way as it is for instance GSM. A decision based on WLAN signal strength, directly or indirectly, will therefore work poorly because the signal strength may drop abruptly within meters or while persons or objects pass by. During the long time to make a vertical handover a walking person may walk into a non-coverage area before the handover is completed. There could be a loss of connectivity and hence causing a gap in the conversation or in the worst-case loss of session.

The difficulty with soft handover is the dependency of a server and that flows need to be synchronized. Transport protocols like TCP must be handled in a non-standard way. This requires an active node and is therefore not attractive. Another difficulty is to decide when a new flow should be established.

Other solutions that have been described in for instance US2003/0193910 and US2002/0085516 separately address similar fields and problems. US2003/0193910 does for example use the movement and position for a handover decisions for a mobile device, but only in relation to network access points, and then only for determining if the mobile device is moving away or towards these access points for detecting what other networks are nearby the mobile device. The position is deduced from IP bindings that only can tell where the network is located and not exactly where the device is located and heading within the network. US2002/0085516 describes the use of connection quality, like packet error rate for performing handover between a local and a global wireless network. However, wireless local area networks do not have uniform coverage, the coverage fluctuates, which means that insufficient coverage areas exists or appear non-uniformly. This means that a safe handover cannot be based on only the position and movement of the device. Both these documents thus fail to address vital difficulties regarding when to initiate handovers, while at the same time ensuring that these handovers are always seamless and not performed unnecessarily often or too early.

There is thus a need for an improved handover for a portable communication device between a local wireless network and a wireless wide area network.

SUMMARY OF THE INVENTION

The present invention is directed towards solving the problem of providing an improved handover technique for a portable communication device between a wireless wide area network and a local wireless network and especially one that allows handover to be initiated in time such that hand over is performed in a seamless way for a real-time communication session.

One object of the present invention is thus to provide an improved method of handing over a wireless voice connection between a local wireless network and a wireless wide area network and especially one that allows handover to be initiated in time such that hand over is performed in a seamless way for a real-time communication session.

According to a first aspect of the present invention, this object is achieved by a method of performing vertical handover of a wireless voice connection, which is part of a voice connection set up between a portable communication device and another communication device, said handover being performed for the portable communication device between a local wireless network and a wireless wide area network, comprising the steps of:

determining a handover situation for the wireless connection to the portable communication device based on a set of handover factors at least comprising the position and movement of the portable communication device in an area of the local network and structural layout information of the area together with knowledge of where in this area there is insufficient coverage, and handing over the connection from the local network to the wide area network or from the wide area network to the local network based on the handover situation.

Another object of the present invention is directed towards providing a call handling server in a local wireless network that provides an improved handover technique for a portable communication device between a wireless wide area network and the local wireless network and especially one that allows handover to be initiated in time such that hand over is performed in a seamless way for a real-time communication session.

According to a second aspect of the present invention, this object is achieved by a call handling server for a local wireless network for controlling voice connections to a portable communication device capable of communicating with the local network and a wireless wide area network, said server comprising:

a control unit arranged to:
  determine a handover situation for a wireless voice connection to the portable communication device, which wireless connection is part of a voice connection set up between the portable communication device and another communication device, said situation being based on a set of handover factors at least comprising the position and movement of the portable communication device in an area of the local network and structural layout information of the area together with knowledge of where in this area there is insufficient coverage, and
  initiate or control the handing over of the wireless connection from the local network to the wide area network or from the wide area network to the local network based on the handover situation.

Yet another object of the present invention is to provide a local wireless network that provides an improved handover technique for a portable communication device between a wireless wide area network and the local wireless network and especially one that allows handover to be initiated in time such that hand over is performed in a seamless way for a real-time communication session.

According to a third aspect of the present invention, this object is achieved by a local wireless network for providing voice connections to a portable communication device capable of communicating with the local network and a wireless wide area network and comprising:

a number of local area wireless access points for the portable communication device, and
a call handling server for controlling voice connections to the portable communication device comprising:
  a control unit arranged to:
    determine a handover situation for a wireless voice connection to the portable communication device, which wireless connection is part of a voice connection set up between the portable communication device and another communication device, said situation being based on a set of handover factors at least comprising the position and movement of the portable communication device in an area of the local network and structural layout information of the area together with knowledge of where in this area there is insufficient coverage, and
    initiate or control the handing over of the wireless connection from the local network to the wide area network or from the wide area network to the local network based on the handover situation.

Yet another object of the present Invention is to provide a computer program product that provides an improved handover technique for a portable communication device between a wireless wide area network and a local wireless network and especially one that allows handover to be initiated in time such that hand over is performed in a seamless way for a real-time communication session.

According to a fourth aspect of the present invention this object is achieved by a computer program product for performing vertical handover of a wireless voice connection, which is a part of a voice connection set up between a portable communication device and another communication device, said handover being performed for the portable communication device between a local wireless network and a wireless wide area network, comprising:

computer program code means, to make a call handling server in the local network execute, when said program code is loaded in the server:
  determine a handover situation for wireless connection to the portable communication device based on a set of handover factors at least comprising the position and movement of the portable communication device in an area of the local network and structural layout information of the area together with knowledge of where in this area there is insufficient coverage, and
  initiate or control handing over of the connection from the local network to the wide area network or from the wide area network to the local network based on the handover situation.

Tracking movement and position relative areas of insufficient coverage is vital for a system that needs to initiate handovers accurately. Therefore the present invention uses the position and movement in relation to areas that are regarded as providing insufficient coverage, which is the factor of importance. In this way truly correct decisions can be taken for determining when handover is to be performed, especially when the system uses information of the areas structural layout as well to finally ensure that the correct decisions are taken in time.

The invention has furthermore the following advantages. It allows seamless handover between the local network and the wide area network while at the same time allowing the use of the local network as much as possible while ensuring that the handover is seamless so any real time communication is seemingly unaffected. When the user makes or receives a call within coverage of local network the call is preferably transferred over the local network because such a call is assumed to be much less costly compared with wide area network calls. Outside the coverage the more expensive wide area network is used. When the user moves between these networks, for instance when moving from indoor office premises towards building exits and beyond, somewhere along this route radio coverage of the local network will gradually be lost. The ongoing call is then taken over by the wide area network without noticeable interruption. It is possible to proactively decide when to initiate a soft handover in a situation where the signal quality fluctuates seemingly unpredictably in a building with known layout and where there is insufficient coverage. By optionally combining several factors such as terminal position, movement and connection quality situations are avoided where the connection quality degrades so fast that it becomes too late to initiate any handover seamlessly. The handover from wide area to local area wireless network is also handled so that the handover is performed as soon as, but no sooner than so the handover is seamless and the local area wireless network is good enough.

BRIEF DESCRIPTION OF THE DRAWINGS

The present invention will now be described in more detail in relation to the enclosed drawings, in which.

3c) shows yet another scenario with a corridor with a door, where the room has an insufficient coverage area.

3d) shows another scenario with an outdoor situation nearby a building where there is good coverage but also spots with insufficient coverage and a user moving towards a building entrance.

3e) shows a scenario with an indoor two level situation with two users approaching the same wall on different levels and how this is handled in the system.

3f) shows a scenario with an area with several users that previously have had sufficient coverage and conditions but due to the many users now dynamically is created as an insufficient coverage area.

DETAILED DESCRIPTION OF EMBODIMENTS

The invention is directed towards vertical handover of connections from a local wireless network to a wireless wide area network and from a wireless wide area network to a local wireless network.

Figure 1:
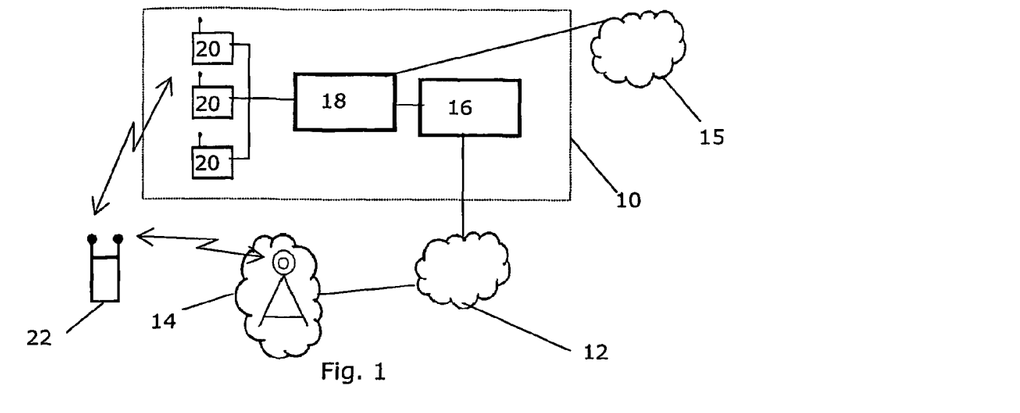
FIG. 1 shows a block schematic of a local wireless network connected to a wireless wide area network, a fixed public telephone network and the Internet.

FIG. 1 schematically shows a local wireless network 10 connected to a public switch telephone network (PSTN) 12 and to a wireless wide area network 14, which wireless wide area network could be but does not have to be a circuit-switched cellular network, which can be a GSM or UMTS network. The local network 10 includes private branch exchange 16 for communicating with the public switched network 12 and the wireless wide area network 14. The local network further comprises a call handling server 18 connected to the PBX 16. This call handling server is arranged for handling wireless communication within the network and is therefore connected to a number of terminal access points or base stations 20 in the local network. The local network 10 is here a packet-switched network in the form of a wireless LAN network using IP-telephony. The call handling server 18 is furthermore connected to the Internet 15 for enabling end to end IP-telephony sessions as well. A portable communication device 22 in the form of a portable phone, which is adapted for communication in both the local wireless network and the wireless wide area network, is also shown in the figure. The phone 22 thus has one function for handling IP-telephony as well as a second function for handling cellular telephony. The terminal is thus a dual terminal capable of using the two networks in parallel. The call handling server 18 directs calls to and from terminals in the local network 10 using IP telephony. It should here be realised that the local network need not be a wireless LAN network, like WiFi/802.11{a,b,g} or WiMax/802.16 or future generations of these, it can also be for instance a Bluetooth network like Bluetooth/802.15 or future generations of it, or perhaps a DECT network. Also the wireless wide area network 14 is any network that offers wireless public telephone service on an at least nation wide coverage basis, including GSM and UMTS but not excluding future generations. The local network need furthermore not include a separate PBX, it can be replaced by an call server enhanced with PBX functionality or data can tunneled out towards a service provider or operators network equipment where the described invention can be situated.

In the system 10 according to FIG. 1, the PBX 16 is a normal private branch exchange arranged to connect in- and outgoing calls. The PBX 16 furthermore includes normal PBX functions such as conference call coupling. The call server however only provides for mobile terminals. All calls to the PBX associated with a mobile terminal are forwarded to the call handling server for processing and connection to the different wireless terminals.

The wide area wireless network 14 is in this embodiment GSM. Over GSM the standard circuit switched connection is used with the GSM codec. For voice communication over WLAN VoIP technology is used. Within WLAN coverage the phone can operate in either technology since the wide area network is also covering the WLAN area but on different frequencies and protocols. The wide area network such as GSM could be assumed to always cover all areas sufficiently or the system may take into account the wide area network coverage factors as well.

Figure 2:
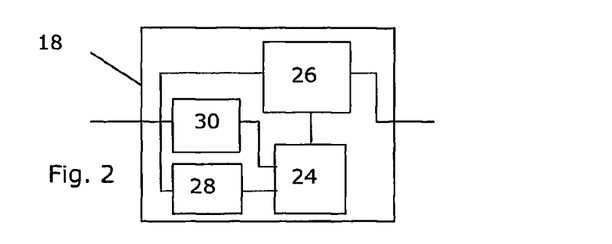
FIG. 2 shows a block schematic of a call handling server provided in the local network.

FIG. 2 shows a block schematic of the various parts of the call handling server 18. The server 18 includes a control unit 24, a connection handling unit 26, a quality measuring unit 28 and a positioning unit 30. When a terminal is within the local network, which is preferably provided in one or several office buildings, the terminal is in contact with the call handling server 18 via one access point. In order to control the connection to the phone, the connection handling unit 26 has stored or accesses a memory which has stored for each terminal, the identity of the terminal within the WLAN network, which can be a fixed IP address or an identity used for assigning an IP-address, a phone number associated with the wide area wireless network as well as the extension number in the PBX or some other unique identifier for the user of the phone. The connection handling unit 26 then connects the phone with the PBX for all in- and outgoing calls, when the phone is in the local network. When in the local network the terminal uses IP-telephony, which means that the connection handling unit 26 transforms and packets incoming signal samples transferred in normal time slots of the PSTN into data packets using IP addressing and sends these to the terminal, which converts the content of the packets into analogue signals.

Figure 3A:
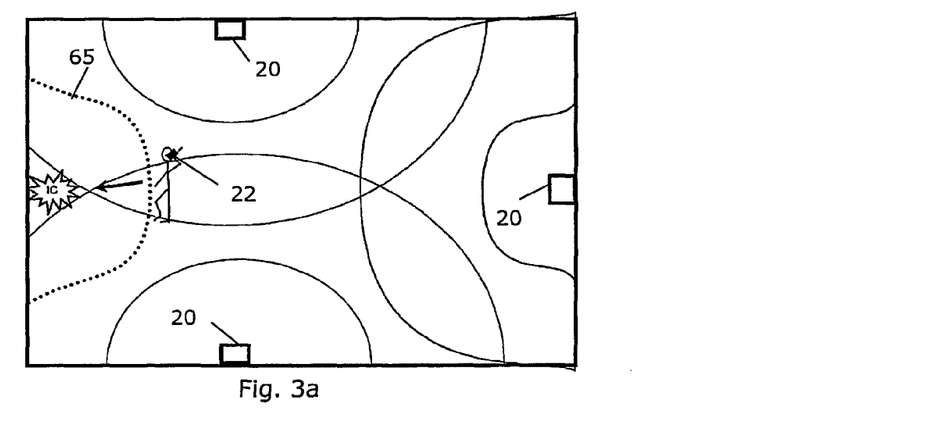
FIG. 3a shows a view of a simple physical environment where a user moves with the portable communication device in relation to an area with insufficient coverage and scenario example of how this are handled by the invention, 3b) shows another scenario with an area of insufficient coverage and a user moving towards it and a "handover border".

FIG. 3a schematically shows the local area where the local wireless network has been provided. For the sake of better understanding the invention, the network is here only provided in one room. It should however be realised that the network can be provided in several more rooms, floors and even different buildings. The single room is however sufficient for explaining the present invention. In the room three different WLAN access points 20 are shown each at a separate wall. One wall does not have an access point 20 and a user holding the portable communication device 22 is moving in the direction of this wall, which can include a door for entrance into the room. The user, who is communicating using the WLAN mode of the terminal, is heading in the direction of the arrow and will reach an area with inadequate coverage, marked "IC", within a time period. A positioning system provided in the positioning unit of the server is tracking the terminal in real time and can out of movement speed and direction extrapolate when it will reach this area. The positioning system can be based on triangulation using the positions of access points or other viable/available means of positioning. The position and movement tracking can also, be based on a system as described in an article by Haeberlen, A., Flannery, E., Ladd, A., Rudys, A., Wallach, D. and Kavraki, L., titled "Practical Robust Localization over Large-Scale 802.11 Wireless Networks", published in the Proceeding of the Tenth Annual International Conference on Mobile Computing and Networking, Sep. 26-Oct. 1, 2004, ACM Press, which is herein incorporated by reference. However other ways of tracking are also feasible. The server has WLAN area coverage knowledge, and is aware of the "IC" area. This information has in the present case been obtained through obtaining knowledge of previous lost and retained connections in the local network. The dotted line shows a calculated border of good coverage 65, where when the terminal passes this line the server will initiate the handover process. A number of solid curves are also shown indicating the coverage of each access point 20. These have been provided through mapping the signal strength for different positions in the area of the local network. Thus different positions all have different signal strengths and thus areas of for instance no coverage or unsatisfactory coverage can be determined beforehand. The "borderline" may be dynamic depending on terminal movement speed, direction, heuristics and statistics to allow enough margins for the handover process to complete before the insufficient coverage area is reached. If the "IC" area were outside the room to the left no handover would be performed since heuristics know this to be impossible movements when for example this wall is also the outer wall and the room is on the third floor. The server can have and use structural layout information of the area such as building constraints and furniture together with knowledge of where in this layout there is insufficient coverage. This information is feasible to gather in a local area network but not in the wide area which may cover up to 10 km2. The structural layout information can be gradually built up out of gathered movement information.

Figure 3B:
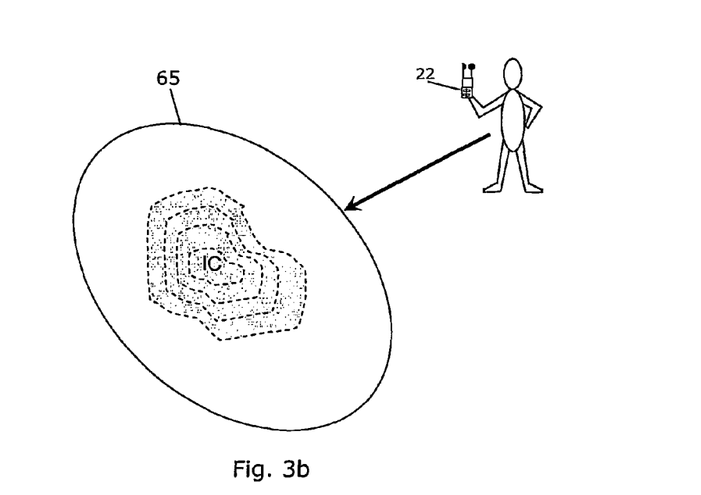

FIGS. 3b-3f further exemplifies scenarios how the invented system works in different situations. FIG. 3b shows an area known to supply insufficient coverage for the user the "IC" ("Insufficient Coverage") area. The server tracks the portable communication device 22 and extrapolates the speed and direction vectors and out of this adjust the handover border 65 so when the terminal passes this "border" the handover is initiated. The distance from the insufficient coverage area IC and the virtual handover border 65 is large enough to ensure that the handover mechanism is completed before insufficient coverage are is reached when initiated at the handover border line for the current speed and direction. Therefore the size or placement of the handover border 65 can be dynamic depending on user speed, direction, heuristics, statistics and potentially individual settings or knowledge about that individual correlated with the authentication of the session in the terminal. There is a minimal "handover border" area that should not be smaller than the insufficient coverage area IC.

Figure 3C:
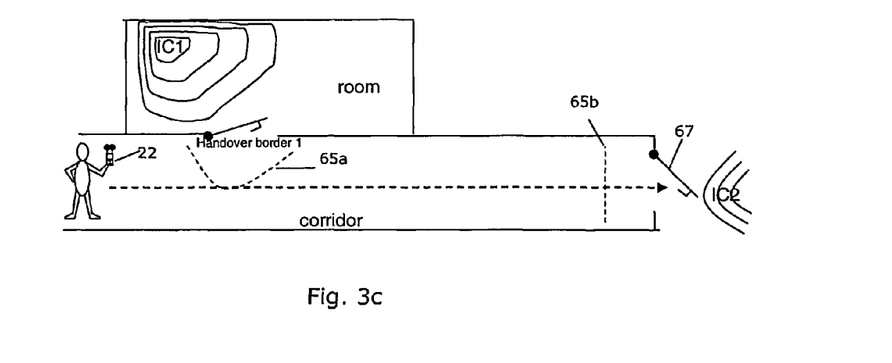

In FIG. 3c the user is having an ongoing conversation on the portable communication device 22 over the local network while moving in a corridor. The corridor has sufficient WLAN coverage, though a room that can be entered from the corridor has a large area in it that is known to have insufficient coverage—IC. In order to guarantee uninterrupted conversation at all times if user enters the room the handover needs to be initiated at the handover border 65a line regardless whether users enter the room and its insufficient coverage area at all. If this behavior is regarded as unwanted and induce too many unnecessary handovers the server can be set to move the handover border inside the room instead, this may lead to some dropped calls or not completely seamless handovers but would decrease the number of unnecessary handovers if the majority of people will pass the room and head for the exit where the handover border 65b would initiate the handover instead anyway. The server may also identify different users in real time to further improve the situation by not initiating a handover at handover border 65a for users that never or rarely enters the room. A combination of this and the above methods may also be used. Further on, individuals' movement patterns in correlation to time can also be used if necessary, or where individuals are classified in different groups. A learning heuristic system may choose to ignore certain individuals movement patterns since there are regarded as a typical, for example cleaning personnel. This scenario can be generalized to that the server differentiates handovers for different users at potentially different times and that the server can loosen guaranteed handovers and trading off perfect handovers at all times to decrease the number of performed handovers.

Figure 3D:
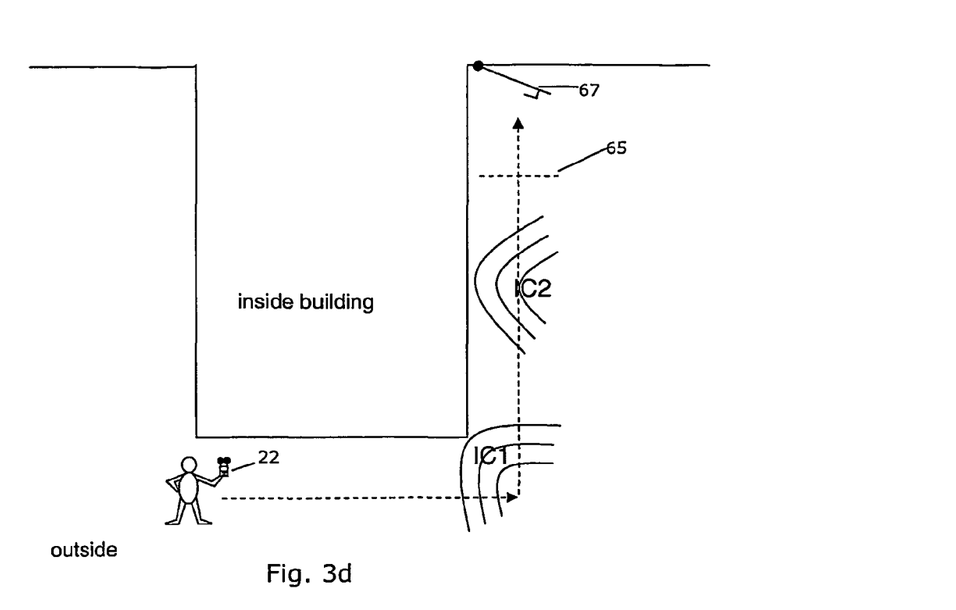

FIG. 3d shows a scenario where a user is having an ongoing conversation on a WAN cellular network and is approaching the corporate building where wireless local area network coverage exists. Just outside the building WLAN coverage is fairly good but not very complete. The user is moving just alongside the building, for example coming from a car park— here WLAN coverage appears and starts to be sufficient at IC1, the server could decide to initiate a seamless handover from cellular WAN to WLAN, though the server knows that the large majority of users will follow the drawn dotted path and cross two areas known to have insufficient coverage IC1 and IC2. The server delays the seamless handover until the user has crossed the handover border 65 just before the building entrance 67 in order to avoid handovers that normally will need to be handed over back again shortly after the previous handover or simply to avoid handing over to WLAN before it is certain that the user will not be able to leave good enough covered WLAN areas so quickly that a new seamless handover back to WAN cannot be guaranteed. This can be generalized into that the WBX when handing over sessions from cellular to WLAN networks can delay the handover until it is certain that coverage will be steady for the user in order to avoid ping-pong effects and/or avoiding handing over connections that may need to be handed over too soon again for uninterrupted service level.

Figure 3E:
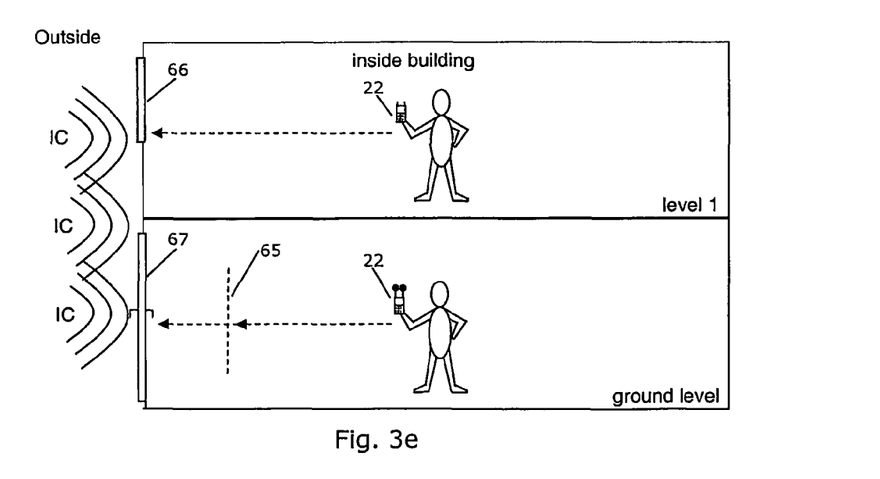

FIG. 3e shows a scenario with a building of two levels, ground level and upper level. Outside the buildings door and window there are areas known to provide insufficient coverage areas IC for wireless local area network telephony conversations. When the server detects a user talking with the portable communication device 22 at ground level approaching the door and the handover border 65 it will initiate a handover to be able to guarantee seamless vertical handover before the user passes the door 67 and enters the insufficient coverage area. On upper level another user is also moving while talking with the portable communication device 22 over the wireless local area network, the user here has the same position and movement as on ground floor, though here the server will know that further movement through the window 66 or wall towards the insufficient coverage area IC outside the building is not possible or realistic and will thus decide not to initiate a seamless handover since it knows the structural layout of the building and how users can move. This example can be generalized into that the server has and uses knowledge of structural layout information of the area such as building constraints, pre-measured knowledge or learned through collecting repeated information from previous users that has moved in this areas of where in this structural layout there is insufficient coverage.

Figure 3F:
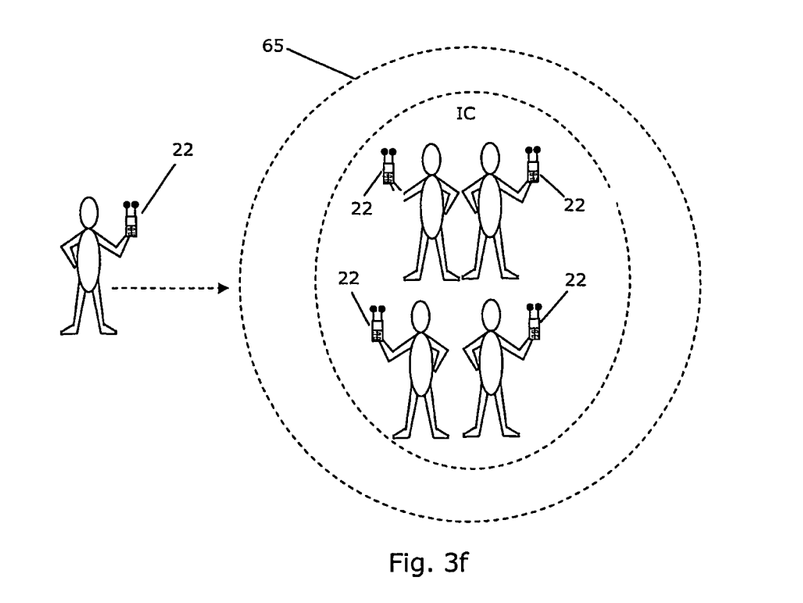

FIG. 3f shows an area that normally has had sufficient WLAN coverage but that may dynamically become insufficient coverage—IC by a number of reasons such as when several users utilize the wireless local area network heavily either for pure data, VoIP traffic or both. This area may become insufficient for real time communication such as VoIP on WLAN periodically. Traffic by itself may not only be the disturbing factor, it is well known that WLAN often is sensitive of many physical bodies in small areas and this may degrade quality in an local area quickly as well. New users moving towards areas detected to deliver temporally insufficient WLAN coverage while having telephony conversations over WLAN with portable communication device 22 will need to be initiated with a seamless handover to cellular WAN before quality is affected and a dynamic handover border is created in real-time by the server that adjusts to the current situation characteristics such as number of users, density of users, traffic volume and type, previously lost or handed over conversations etc in order to guarantee service level. This can be generalized to that the WBX dynamically can adjust to wireless network characteristic and usage by creating temporary and size-variable handover borders.

In the vertical handover situation, which will be described shortly, the assumption is that the coverage of the wide area wireless network can be constant and good. There is thus no measurement of the conditions in that network and handover is only based on the conditions in the local network. It is furthermore preferred to use the local network as much as possible in order to keep the costs associated with phone calls as low as possible. It is however possible to include wide area network factors as yet another criterion in this system if it is deemed necessary and thus not use this assumption that the phone has good wide area network coverage.

It is assumed and observed that the phone often has wide area network coverage at the same time as WLAN coverage. In principle a soft or seamless handover can take place anytime whenever there is WLAN coverage and there are no insufficient coverage areas in the predicted movement path. However, due to the cost factor and better quality of WLAN it should be used as long as possible before a handover. In order to know when to initiate handover the server needs to be proactive so that a soft handover is carried through before a user moves out of WLAN coverage. The existing and conventional techniques for horizontal handover are based on comparison of signal strength between Access Points. For vertical handover the two transmission techniques use different signal strengths and are not therefore direct comparable.

Furthermore, WLANs only have local coverage, the signal quality may fluctuate heavily and can quickly degrade while moving in a building which make a prediction when to do a handover hard or impossible using only signal quality.

"Seamless" and "without interruption" is a subjective criteria. Some may notice a quality shift while a handover is performed, though it should not affect a phone conversation adversely. GSM horizontal handover is used as a reference— mostly this handover is totally transparent, sometimes a sub second glitch may be noticed.

Calls initiated from WLAN phones are routed first through the server and then through the PBX. Incoming calls to the PBX with destination WLAN phone is routed to the server and to the WLAN if the phone is within the coverage of the WLAN. If it is outside the coverage the call could be either forwarded to the wide area network or the server could initiate a "non reachable signal" or let the PBX direct the call to a voice box or other service.

The functioning of the present invention in case handover is made from the local to the wide area network will now be described with reference being made to FIGS. 1, 2, 3 and 4, where the latter shows a flow chart of a method of handing over from the local to the wide area network. The method according to the present invention starts with a phone call being received from another communication device for instance via the PSTN 12 in the server of the local network, step 32. It should be realised that the call could have been received from any of the networks 10, 12, 14 or 15. It should also be realised that the call could have been set up by the portable communication device 22 to the other communication device. This call is then set up to the portable communication device 22 in the local network 10, step 34, using the identifier of the local network. The call is set up under the control of the connection handling unit 26 in the server 18. Here a conversion from PCM signals to IP-telephony is performed and the communication is performed via the access points 20 of the local network. Thereafter a number of handover factors are measured, step 36. The measurements can be made by either the portable communication device 22 or the access points 20 and the results being forwarded to the server 18 or by the server itself. The results are provided to the positioning unit 30 and the quality measuring unit 28 of the server 18, where the latter unit is responsible for collecting various measurement results. In the preferred embodiment of the invention a number of handover factors are measured. One such factor is the connection quality, which is determined based on real time monitoring of the WLAN connection. One subfactor of the connection quality is the previously described signal strength. Other subfactors are the drop rate of packets for data packets transmitted between the portable communication device 22 and the access points 20 during a specified sliding time or bit error rate for data packets transmitted between the portable communication device 22 and the access points 20 during a specified sliding time. Only one of these subfactors may be used, a combination of these may be used or they may all be used. Other possible connection quality subfactors are the jitter buffer size of the portable communication device and/or the latency of sound from one end point to another. The results of the measurements of these factors are all provided to the quality measuring unit 28. The primary handover factor is obtained through real time tracking of the portable communication device by determining the position and movement of the portable communication device where the area layout could be known. Position information, preferably but not necessarily obtained via the wireless local area access points 20, is here provided to the positioning unit 30. Here a movement vector is calculated for the portable communication device 22, where this vector includes information on the direction and speed of movement in relation to the position of the device 22 in three dimensions within the local network coverage area. The time sampling interval for the tracking must be smaller than the time to do a handover. The positioning accuracy could also be included such that less accuracy requires higher sampling frequency. Areas where positioning is performed can be pre-measured regarding their physical layout, structure and furniture. Within these areas where there are positions of insufficient coverage they have been identified and stored to enable mechanisms of preventive handover. This information can also be built gradually by the system while it runs avoiding enforcing pre-measurements.

Figure 4:
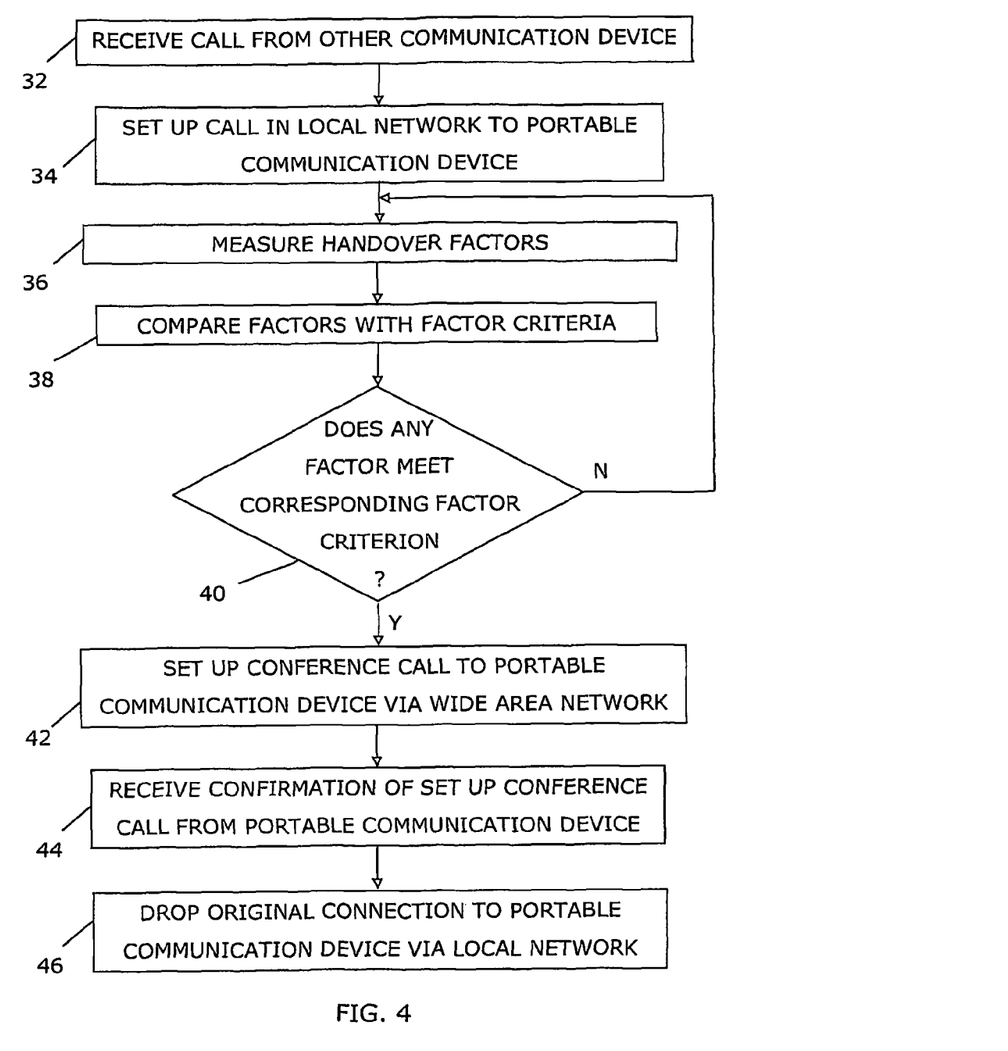
FIG. 4 shows a flow chart of a method of handing over a call from the local to the wide area wireless network according to the invention.

The different factors are then provided from the positioning unit 30 and the quality measuring unit 28 to the control unit 24, where they are compared with corresponding factor criteria, step 38. For the connection quality the subfactors are compared with corresponding adjustable thresholds. For the position and movement factor, the vector information is compared with a corresponding threshold. This latter comparison is made in the following way. When a user reaches the border of good coverage a soft handover is initiated. The control unit 24 decides when there is time for a handover from WLAN 10 to wide area network 14. The time for performing a handover plus a safety margin is compared with the distance of the portable communication device to the closest border of good coverage in the direction of the movement divided by the speed of the portable communication device in this direction, where the border of good coverage is the border to a spot where there is insufficient coverage "IC". The determination of insufficient coverage border is then based on heuristics, in that an area where there have been a lot of dropped calls is determined to be such an area. It can also be determined based on the previous measurement of any of the subfactors of the connection quality factor for the area, i.e. for measured signal strength, bit error rate, dropped packet rate, signal to noise ratio and signal strength, where this area is deemed to have insufficient coverage if thresholds corresponding to these subfactors had not been met for the location in question, perhaps based on a percentage of the number of successful connections in relation to a total number of connections.

If none of the factors meet the criteria, step 40, measuring continues, step 36. If any of the factors meets a corresponding factor criterion, or one of the subfactors meets a corresponding factor criterion, i.e. if the signal strength meets the signal strength threshold, the dropped packet rate meets the dropped packet rate threshold, the bit error rate meets the bit error rate threshold or the position and movement factor meets the position and movement criterion, step 40, a vertical handover is performed to the wide area network 14. The control unit 24 then initiates or controls the connection handling unit 26 for performing a handover. A handover is thus performed for the first factor that meets a corresponding factor criterion. In the case of the position and movement criterion care is also taken concerning the map information about the area where the local network is implemented. This information includes information such as what the area looks like, like for instance if there are obstacles, for instance in the form of walls, floors ands ceilings, which indicates that the device cannot move all the way to the point of insufficient coverage. This type of heuristics is thus also used in the decision. The thresholds that the factor or subfactors are compared with are furthermore adjustable so that the system can adjust itself for providing a higher rate of successful handovers.

The handover is performed by the connection handling unit 26 initiating a new wide area network connection to the phone 22 and in this case setting up a three-way conference call via the PBX 16 to the portable communication device using the phone number of that device in the wireless wide area network 14, step 42. This call has a certain identity, which the portable communication device 22 recognises and will therefore accept the handover request. The portable communication device 22 can know the identity beforehand or receive it from the server 18 via the local network 10. It is normally the phone number used by the PBX 16 when setting up the connection. When the connection is to be established, the connection handling unit 26 will splice the stream so that the call goes to both the WLAN interface as well as the wide area network interface. Thus a parallel voice connection is set up, so that the voice signals from the other communication device are bi-cast to the portable communication device 22 via the access points 20 in the local network 10 and via the normal phone connection set up from the server 18 to the portable communication device 22 via the wide area network 14. A terminal can simultaneously receive and send data on both WLAN and wide area network interfaces. The parallel streams are furthermore synchronised by the connection handling unit 26 such that the portable communication device 22 now simultaneously receives a voice-over-IP stream and a circuit switched or packet based wide area network coded stream. The streams thus have different data representation, where the data representation of the original voice-over-IP stream is transcoded into the representation of the wireless wide area network. The transcoding may be explicitly done by the connection handling unit 26 of the server 18 or implicitly done somewhere else along the network. This allows soft handover and avoids the problems of explicit synchronization of packets at the terminal 22, avoids the need for multicast functionality over a circuit switched or packet based network and avoids the need for a server in the local network that translates packet voice into a circuit switched voice stream. The portable communication device 22 then automatically confirms the set up of the conference call to the server 18 through signalling in the local network 10. After the phone confirms that the wide area network connection is streaming data and after it has synchronized the two streams, it switches the speaker and microphone to the connection in the wide area network 14. When the connection handling unit 26 receives this confirmation, step 44, it drops the original connection in the local network, step 46. As has been seen above the server 18 controls the whole handover. In the process of handing over, the quality of the wide area network 14 is furthermore never investigated, it is assumed to always be sufficient. The method is thus partly directed towards simultaneously streaming packet voice to two interfaces during vertical handover. Existing IP multicasting solutions assumes that packets are sent to both interfaces with a multicast protocol using a marking of packets for synchronization. This protocol does not work in the wide area network since it does not use packets. Instead existing three party telephone conference mechanisms are used to create the same functionality as for multicast without requiring a multicast IP-address and packet voice.

Figure 5:
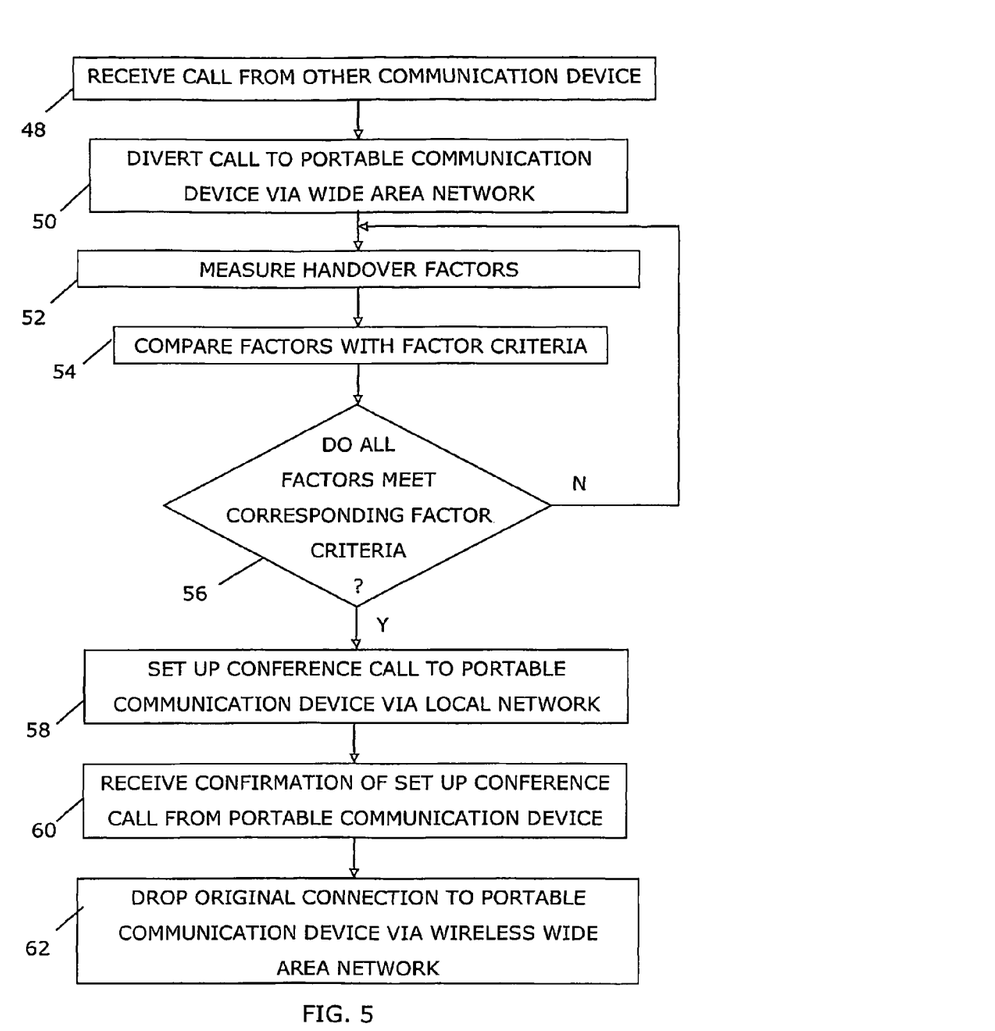
FIG. 5 shows a flow chart of a method of handing over a call from the wireless wide area network to the local wireless network according to the invention, and FIG. 6 schematically shows a computer readable medium in the form of a CD Rom disc comprising computer program code for performing the method according to the invention.

Now a method of handing over from the wide area network to the local network will be described with reference being made to FIGS. 1 and 5, which the latter shows a flow chart for performing vertical handover from the wide area network to the local network. First a call is received by the server 18 in the local network 10 intended for the portable communication device 22 from the other communication device, step 48. The server 18 then diverts the call to the wide area network 14 by calling the phone number of the portable communication device 22 in that network such that the call is routed via the wide area network 14, step 50. Thereafter handover factors are measured for the portable communication device 22 in the local network 10 in the same way as was mentioned previously, step 52. Thereafter these factors are compared with factor criteria, in the same way as described above, step 54. When the user now moves into the coverage area of the local network, these criteria can be measured. The position and movement factor is now set such that the criteria is met if the portable communication device 22 will reach an area far enough into the local network 10 where the coverage is deemed to be good when handover is completed. If all factors and subfactors meet the corresponding criteria, i.e. the connection is deemed stable and good, step 56, then a handover is made. If that is not the case, step 56, measuring continues, step 52. When a handover has been decided, the server sets up a three-way conference call with the portable communication device, where the new parallel connection is now set up in the local network 10, step 58, where the call can likewise have a certain identity identifying it as a vertical handover. The portable communication device then automatically confirms the set up of the bi-cast parallel connection and when the server receives the confirmation, step 60, it drops the original connection via the local network, step 62.

According to the present invention, the server in the local network thus decides when to initiate a vertical handover in a way that maintains quality as well as maximizes usage of the WLAN over the wide area network and is able to stream voice over two different network interfaces simultaneously and to identify the streams during a seamless handover.

A wide area network initiated call directly to the terminal outside direct control of the server can as an alternative be handed to the WLAN interface when the wide area network operator terminates the call at their main switch and forwards the call to the server. The operator can select to forward calls to terminals only within server controlled WLAN coverage, the server communicates this availability to the operator switch. In this case it involves active participation of a wide area network operator.

Figure 6:
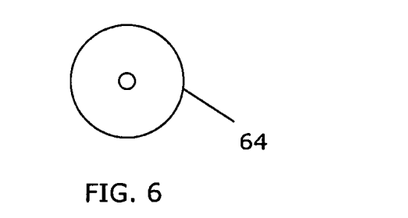

The units of the server can be provided either as software running on a computer or as hardware components or a combination of software and hardware components. Therefore both the methods of the invention can be provided as a computer program product, which performs the invention when being loaded into the server. The computer program product can be implemented as software that can be downloaded into the server from a remote location. It can also be provided in the form of a data carrier, for Instance a CD ROM disc 64 as shown in FIG. 6. It should however be realised that other types of data carriers can be used instead.

There are a number of variations that can be made within the scope of the invention. The server may allow users to set individual handover options. System administrators can also set default rules depending on cost factors, company policy, security etc.

The user may set the terminal to perform automatic handover or may choose to be informed about handover and manually decide when it is should be performed.

An automatic setting may prioritize cost over quality—typically prioritizing local area network over occasionally loosing connection or receive bad quality, even when risking losing the connection for a period. A setting may prioritize connection quality over cost instead—typically prioritizing wide area network and only use the local area network when conditions are optimal.

The thresholds can be set for trade-offs between cost and quality. This includes the thresholds on lost packets, bit errors, margins, signal strengths, positioning and movement. The user or administrator could also set how reactive (or how much damping) the system should be on variations in quality parameters (by the means of putting weights on sampled values, time window sizes, etc).

Other trade-offs could be setting jitter buffer sizes, trading packet loss or masking handovers for an increased overall delay.

A heuristic system can be used that statistically learns successful handovers and discards unsuccessful ones thereby automatically adjust proper thresholds. For instance the time to do a handover for the position and movement factor may be readjusted according to experience.

It is furthermore possible to use only a subset of the above-mentioned factors in determining a handover condition. For instance the bit error rate can be used solely or in combination with any of the other factors like dropped packet rate or signal strength or the position and movement factor. The position and movement factor may furthermore use the heuristics of one or more previous subfactors of the connection quality factor. The position and movement may use structural layout information of the area together with knowledge of where in this area there is insufficient coverage If the call over WLAN is lost unexpectedly anyhow the call is handed over to the wide area network anyway. If the WLAN connection is established again the call may be directed back to the WLAN. During the transition period of no connection the other party not on the handover controlled network can be informed with for example sampled speech that the connection with the other participating party is soon to be established again.

The parallel connection was previously described as being set up by the server. The invention is not limited to this. The server can for instance order the portable communication device to set up the parallel connection instead.

The solution is also applicable in cases where a wide area network operator incorporates part of the solution so that a dialled wide area network number may reach the operators fixed network but never enter the wide area network but instead directly connect to the server either via the PSTN network or via IP and through this reach the same terminal via WLAN when this is possible. In this case parts of the PBX functionality is performed in another server within the operators network, this server and the local server communicates very similarly with each other as in the plain PBX case.

The PBX does not necessarily have to be included in the local network. The server can itself set up connections to the wireless wide area network, for instance via the Internet. A three-party conference call is therefore also not the only way to provide the bi-cast streams. These parallel streams can thus also be provided as two separate unrelated connections.

The present invention has many advantages. When the user makes or is receiving a call within coverage of WLAN the call is preferably transferred over WLAN because such a call is assumed to be much less costly compared with wide area network calls. Outside the coverage the more expensive wide area network is used. When the user moves between these networks, for instance when moving from indoor office premises towards the building exits and beyond, somewhere along this route radio coverage of the WLAN network will gradually be lost. The ongoing call should then be taken over by the wide area network without noticeable interruption.

The solution works in the application layer of the different networks, not in the network layer and thereby greatly simplifies implementation and also allows fewer changes in the networks since it functions as an overlay network on top of the two networks instead.

Certain network cross layer optimizations are performed according to the present invention, more specifically information from lower layer link information such as for example network layer packet error rate is passed to an application layer server where this information influence the handover decision to a completely separate wide area network such as GSM.

The invention will furthermore handle or avoid the following problems:

Bi-cast of streams with different representation. According to the invention, two voice streams for simultaneous streaming to both a packetized WLAN interface as well as to a connection, bit streamed wide area network-interface are created by using three party phone call software in a novel way.

Unpredictable signal strength quality. It is possible to proactively decide when to initiate a soft handover in a situation where the signal quality fluctuates seemingly unpredictably in a building. By combining several factors, including voice packet loss, bit error rate, terminal position and possibly signal strength, movement situations are avoided where the connection quality degrades so fast that it becomes too late to initiate a handover seamlessly.

The invention claimed is:

1. A method of performing vertical handover of a wireless voice connection, which is part of a voice connection set up between a portable communication device and another communication device, said handover being performed for the portable communication device between a local area wireless network, having an area comprising at least one building, and a wireless wide area network, comprising the steps of:
   measuring a set of handover factors for the wireless connection to the portable communication device, the handover factors comprising:
      information of a current position, speed and direction vector of the portable communication device in the area of the local network,
      information of a structural layout of an interior of the building, and information of where in the building there is insufficient coverage,
   determining a dynamic handover border based on the current position, speed and direction vector of the portable communication device and the structural layout of the interior of the building, the handover border having a distance to an insufficient coverage area that is large enough to ensure that a handover mechanism is completed before the insufficient coverage area is reached for the current speed and direction vector of the portable communication device;
   learning atypical movement patterns of certain individuals;
   ignoring the learned atypical movement patterns of the certain individuals by not performing a handing over when the handing over would otherwise be performed; and
   handing over the connection from the local area wireless network to the wireless wide area network or from the wireless wide area network to the local area wireless network when the portable communication device reaches the handover border, wherein
   handovers for different users are differentiated at potentially different times based on past movement patterns of individual users in correlation to time.

2. The method according to claim 1, wherein a connection quality between the portable connection device and the local area network is based on at least one subfactor in a group of subfactors consisting of:
   a bit error rate between the portable communication device and the local area wireless network,
   a signal strength of the portable communication device in the local area wireless network,
   lost packets of the portable communication device in the local area wireless network,
   a number of retransmitted packets of the portable communication device in the local area wireless network, and
   a signal to noise ratio of the portable communication device in the local area wireless network.

3. The method according to claim 1, wherein collected statistics of lost and retained connections are used to map areas of insufficient coverage in the local area wireless network.

4. The method according to claim 1, where the handover border relates to an area marked as providing insufficient coverage, the area can be pre-defined or measured, dynamically created through information gathering in the system and can as well be dynamically removed when information indicates this.

5. The method according to claim 1, where the portable communication device is originally communicating with the local area wireless network or the wireless wide area network and wherein the step of handing over comprises setting up an additional, parallel connection between the portable communication device and another network selected from a group consisting of the local area wireless network and the wireless wide area network, where voice signals from another communication device to the portable communication device are bicast to the portable communication device via the two parallel connections, and dropping an original connection after the additional, parallel connection has been set up.

6. The method according to claim 5, further comprising the step of confirming the setting up of the additional, parallel connection, by the portable communication device to the local area network, before the dropping is performed.

7. The method according to claim 5, wherein the additional, parallel connection to the portable communication device has a certain identity and further comprising the step of accepting, by the portable communication device, the additional, parallel connection in dependence of the identity.

8. The method according to claim 1, wherein:
   the handing over further comprises:
      setting up a parallel connection between the portable communication device and the another communication device by setting up a conference call to the another communication device using a phone number of the another communication device in the another network, voice signals from the another communication device to the portable communication device being bicast to the portable communication device via a first existing connection between the portable communication device and the another communication device and the parallel connection between the portable communication device and the another communication device, and
      dropping the first existing connection after the parallel connection has been set up.

9. A call handling server for a wireless local network for controlling voice connections to a portable communication device capable of communicating with the wireless local network and a wireless wide area network, said server comprising:
   a computer processor configured to:
   measure a set of handover factors for a wireless voice connection to the portable communication device, the wireless voice connection being part of a voice connection set up between the portable communication device and another communication device, said set of handover factors comprising:
      information of a current position, speed and direction vector of the portable communication device in an area of the wireless local network, the area comprising at least one building,
      information of a structural layout of an interior of the building, and information of where in the building there is insufficient coverage, determine a dynamic handover border based on the current position, speed and direction vector of the portable communication device and the structural layout of the interior of the building, the handover border having a distance to an insufficient coverage area that is large enough to ensure that a handover mechanism is completed before the insufficient coverage area is reached for the current speed and direction vector of the portable communication device;

learn atypical movement patterns of certain individual users;

ignore the learned atypical movement patterns of the certain individuals by not performing a handing over when the handing over would otherwise be performed; and initiate or control the handing over of the wireless connection from the wireless local network to the wireless wide area network or from the wireless wide area network to the wireless local network when the portable communication device reaches the handover border, wherein handovers for different users are differentiated either at potentially different times based on past movement patterns of individual users in correlation to time, or are differentiated based on the individual users being classified in different groups.

10. The call handling server according to claim 9, wherein, during the handing over, the computer processor is further configured to:

set up a parallel connection between the portable communication device and the another communication device by setting up a conference call to the another communication device using a phone number of the another communication device in another network of the wireless local network and the wireless wide area network, voice signals from the another communication device to the portable communication device being bicast to the portable communication device via a first existing connection between the portable communication device and the another communication device and the parallel connection between the portable communication device and the another communication device, and dropping the first existing connection after the parallel connection has been set up.

11. A wireless local network for providing voice connections to a portable communication device capable of communicating with the wireless local network and a wireless wide area network and comprising:

a number of local area wireless access points for the portable communication device, and a call handling server for controlling voice connections to the portable communication device comprising:

a control unit configured to:

measure a set of handover factors for a wireless connection to the portable communication device, the wireless connection being part of a voice connection set up between the portable communication device and another communication device, said set of handover factors comprising:

information of a current position, speed and direction vector of the portable communication device in an area of the local network, the area comprising at least one building, information of a structural layout of an interior of the building, and information of where in the building there is insufficient coverage, determine a dynamic handover border based on the current position, speed and direction vector of the portable communication device and the structural layout of the interior of the building, the handover border having a distance to an insufficient coverage area that is large enough to ensure that a handover mechanism is completed before the insufficient coverage area is reached for the current speed and direction vector of the portable communication device;

learn atypical movement patterns of certain individual users;

ignore the learned atypical movement patterns of the certain individuals by not performing a handing over when the handing over would otherwise be performed; and initiate or control the handing over of the connection from the wireless local network to the wireless wide area network or from the wireless wide area network to the wireless local network when the portable communication device reaches the handover border, wherein handovers for different users are differentiated either at potentially different times based on past movement patterns of individual users in correlation to time, or are differentiated based on the individual users being classified in different groups.

12. The wireless local network according to claim 11, wherein, during the handing over, the control unit is further configured to:

set up a parallel connection between the portable communication device and the another communication device by setting up a conference call to the another communication device using a phone number of the another communication device in another network of the wireless local network and the wireless wide area network, voice signals from the another communication device to the portable communication device being bicast to the portable communication device via a first existing connection between the portable communication device and the another communication device and the parallel connection between the portable communication device and the another communication device, and drop the first existing connection after the parallel connection has been set up.

13. A computer program product for performing vertical handover of a wireless voice connection, which is a part of a voice connection set up between a portable communication device and another communication device, said handover being performed for the portable communication device between a local wireless network and a wireless wide area network, comprising:

a non-transitory computer readable medium, said medium comprising:

computer program code, configured to make a call handling server in the local wireless network execute, when said program code is loaded in the server:

measure a set of handover factors for the wireless voice connection to the portable communication device, said set of handover factors comprising:

information of a current position, speed and direction vector of the portable communication device in an area of the local wireless network, the area comprising at least one building, information of a structural layout of an interior of the building, and information of where in the building there is insufficient coverage, determine a dynamic handover border based on the current position, speed and direction vector of the portable communication device and the structural layout of the interior of the building, the handover border having a distance to an insufficient coverage area that is large enough to ensure that a handover mechanism is completed before the insufficient coverage area is reached for the current speed and direction vector of the portable communication device;

learn atypical movement patterns of certain individual users;

ignore the learned atypical movement patterns of the certain individuals by not performing a handing over when the handing over would otherwise be performed; and initiate or control the handing over of the connection from the local wireless network to the wireless wide area network or from the wireless wide area network to the local wireless network when the portable communication device reaches the handover border, wherein, said computer program code is further configured to make the call handling server execute, during the handing over:

set up a parallel connection between the portable communication device and the another communication device by setting up a conference call to the another communication device using a phone number of the another communication device in another network of the local wireless network and the wireless wide area network, voice signals from the another communication device to the portable communication device being bicast to the portable communication device via a first existing connection between the portable communication device and the another communication device and the parallel connection between the portable communication device and the another communication device, and dropping the first existing connection after the parallel connection has been set up.

* * * * *